United States Patent
Wada et al.

[11] Patent Number: 6,030,536
[45] Date of Patent: Feb. 29, 2000

[54] DISPOSAL METHOD FOR FUEL OIL AND CRUDE OIL SPILLS

[75] Inventors: Yukio Wada, Mito; Kazumasa Kosugi, Naka-gun; Masaki Ozawa, Naka-gun; Kaoru Sugawara, Naka-gun; Hidechiyo Kashihara, Mito; Nobuyuki Sasao, Naka-gun, all of Japan

[73] Assignee: Japan Cycle Nuclear Development Institute, Tokyo, Japan

[21] Appl. No.: 09/048,218

[22] Filed: Mar. 26, 1998

[30] Foreign Application Priority Data

Apr. 1, 1997 [JP] Japan ..................... 9-082942

[51] Int. Cl.⁷ ..................... B01D 15/00
[52] U.S. Cl. ..................... 210/671; 210/680; 210/691; 210/763; 210/924; 210/925; 204/514; 205/696
[58] Field of Search ..................... 210/660, 671, 210/679, 680, 691, 758, 769, 791, 922–925, 763; 204/513, 514; 205/688, 695, 696, 751

[56] References Cited

U.S. PATENT DOCUMENTS

| | | |
|---|---|---|
| 3,673,065 | 6/1972 | Anderson . |
| 3,865,711 | 2/1975 | Anderson . |
| 3,867,285 | 2/1975 | Keller, Jr. . |
| 3,980,566 | 9/1976 | Peterson . |
| 4,121,993 | 10/1978 | Krugmann . |
| 4,206,080 | 6/1980 | Sato et al. . |
| 4,325,846 | 4/1982 | Shibata . |
| 4,383,901 | 5/1983 | Smith et al. . |
| 4,874,485 | 10/1989 | Steele . |
| 4,919,819 | 4/1990 | Robinson et al. . |
| 5,580,461 | 12/1996 | Cairns et al. . |
| 5,723,039 | 3/1998 | Zosimov et al. . |

FOREIGN PATENT DOCUMENTS

| | | |
|---|---|---|
| 0 297 738 | 1/1989 | European Pat. Off. . |
| 49-113795 | 12/1974 | Japan . |
| 56-100102 | 8/1981 | Japan . |
| 63-221187 | 9/1988 | Japan . |
| 3-193185 | 8/1991 | Japan . |
| 1 543 836 | 4/1979 | United Kingdom . |
| 2 211 496 | 7/1989 | United Kingdom . |
| 93 17971 | 9/1993 | WIPO . |
| 94 03399 | 2/1994 | WIPO . |
| 97 10030 | 3/1997 | WIPO . |

OTHER PUBLICATIONS

WPI Abstract No. 72–56810T (DE 2206324) (1972).
WPI Abstract No. 88–336559 (SU 1395667) (1988).

*Primary Examiner*—David A. Simmons
*Assistant Examiner*—Fred Prince
*Attorney, Agent, or Firm*—Oliff & Berridge, PLC

[57] ABSTRACT

A method for easily decomposing viscous, solidified spilled fuel oil or crude oil containing sea water and other disposal inhibiting substances. Titanium dioxide particles are added to viscous spilled fuel oil recovered in drums in a weight ratio of at least 0.2 to 1 times. Fuel oil is specifically adsorbed by the adsorbent and the mixture can be suspended in water. The suspension is filtered by a coarse filter to remove substances interfering with disposal by the oil. This filtrate is passed through a high performance filter (of sufficiently fine mesh to retain the adsorbent) so that the adsorbent is recovered, and sea water and other substances are discarded.

15 Claims, 2 Drawing Sheets

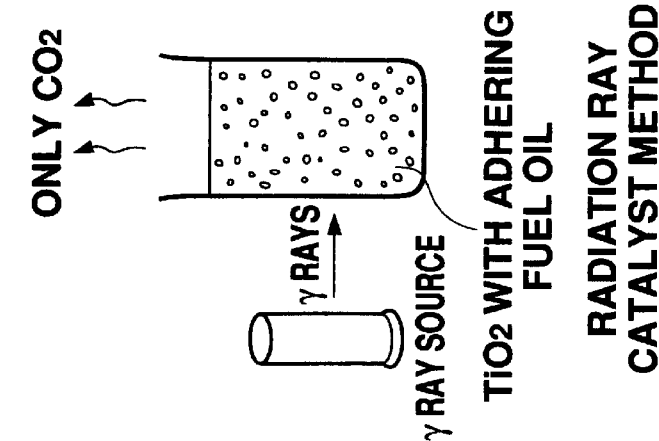
Fig. 4
RADIATION RAY CATALYST METHOD
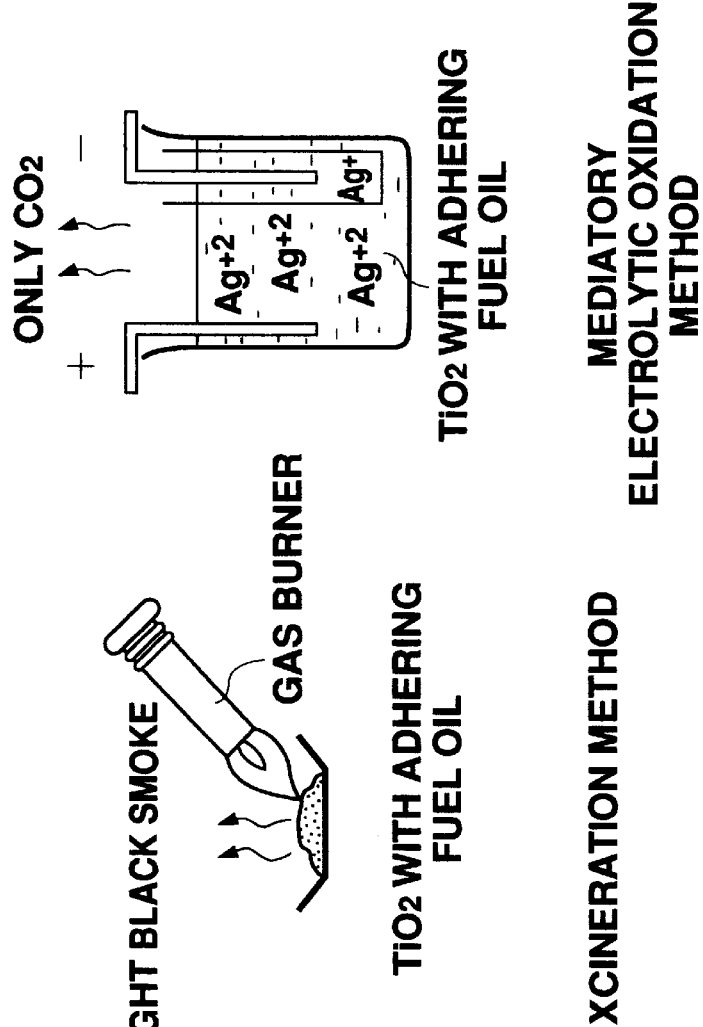
Fig. 3
MEDIATORY ELECTROLYTIC OXIDATION METHOD
Fig. 2
EXCINERATION METHOD

# DISPOSAL METHOD FOR FUEL OIL AND CRUDE OIL SPILLS

BACKGROUND OF THE INVENTION

This invention relates to a method for disposal of spilled fuel oil or crude oil containing a large amount of a disposal inhibiting substance such as sea water.

Most fuel oil and crude oil is transported over sea by very large tankers. In recent years, many accidents have occurred wherein the fuel oil or crude oil has leaked out of the tanker during transport due, for example, to tanker damage.

The fuel oil or crude oil which has spilled out spreads over the sea and pollutes it, destroying the ecosystem.

This fuel oil or crude oil is mostly recovered by aspirating the layer of oil floating on the ocean surface using a suction apparatus. The recovered fuel oil or crude oil is usually disposed of by incinerating it.

Immediately after an oil spill, the fuel oil or crude oil floats on the surface of the water. However, after some time has elapsed, it becomes mixed with sea water due to the force of the waves, and gels to form a high viscosity solid. This gelation is particularly conspicuous when the oil from the spill is struck by strong waves and mixes with sea water when it is washed up on beaches.

Fuel oil or crude oil which has gelled in this way cannot be recovered by a suction apparatus due to its high viscosity, so recovery must be performed manually.

However, even if the fuel oil or crude oil is successfully recovered, the recovered mixture contains from approximately 80% to 90% sea water which effectively prevents its disposal by incineration, due not only to the sea water itself, but also to the quenching action of the contained chlorine.

It might be thought that, in order to make it possible to incinerate the fuel oil or crude oil, the water contained in the solidified oil could be removed, e.g., by evaporation. However, it is an almost impossible task to remove the sea water (approx. 10 times the amount of oil) contained in several tens of tons to several hundred tons of fuel oil or crude oil. Moreover, the fuel oil or crude oil mixed with the solid oil covers the sea water contained therein which interferes with its evaporation.

It might also be thought that removing the chlorine having a quenching action would assist combustion to at least a small degree, but, as recovered spilled fuel oil or crude oil has a high viscosity and does not disperse in water, chlorine cannot be removed from this solidified oil.

For these reasons, it is extremely difficult to dispose of spilled fuel oil or crude oil, and in particular, fuel oil or crude oil of high viscosity. It is therefore an object of this invention, which was conceived in view of the aforesaid problems, to provide a method for easily disposing of high viscosity, solidified fuel oil or crude oil containing a large amount of sea water.

SUMMARY OF THE INVENTION

To achieve the above object, the method for disposing of fuel oil or crude oil according to this invention is characterized in comprising an adsorbent mixing step wherein an adsorbent is mixed with high viscosity fuel oil or crude oil containing disposal inhibiting substances.

In this adsorbent mixing step, high viscosity spilled fuel oil or crude oil is mixed with the adsorbent, and the fuel oil or crude oil adheres to the adsorbent. After mixing with the adsorbent, the viscosity of the spilled fuel oil or crude oil falls. It can then be dispersed in water by mixing, etc., although it was initially impossible to disperse due to its high viscosity. As a result of this decreased viscosity and increased dispersibility, the fuel oil or crude oil can be separated from substances contained in the oil which interfere with its disposal.

In addition to salts contained in sea water, the oil usually contains other disposal inhibiting substances such as algae, stones, and sand. This invention is therefore useful not only for separating and recovering spilled fuel oil or crude oil, but also for separating and recovering and cleansing stones and sand in the spilled oil.

The aforesaid adsorbent may be an oxide powder which can adsorb oil such as $TiO_2$, $ZrO_2$ and $Al_2O_3$. $TiO_2$ is preferably used as adsorbent since it can adsorb almost 5 times as much oil as $Al_2O_3$, and can adsorb almost twice as much as $ZrO_2$. When $TiO_2$ is used, therefore, a lesser amount is required to adsorb the fuel oil or crude oil than when other oxides are used.

To increase the adsorption power of the adsorbent stated hereabove, it is desirable to convert it to a fine powder in order to increase its surface area. This fine powder differs according to the physical properties of the oxide selected, however it is desirable to use a powder having a particle diameter ranging from approximately several nanometers to several hundred micrometers.

The method for disposal of fuel oil or crude oil according to this invention is characterized by comprising an adsorbent mixing step for mixing an adsorbent with spilled high viscosity fuel oil or crude oil containing disposal inhibiting substances, and an adsorbent recovery step for separating and recovering adsorbent to which fuel oil or crude oil adheres in the adsorbent mixing step.

This fuel oil or crude oil adsorbent recovery step is performed as follows.

First, the mixture from the aforesaid adsorbent mixing step is suspended in water. In the water, the fuel oil or crude oil adsorbent and disposal inhibiting substances are separated.

Subsequently, disposal inhibiting substances of larger size than the fuel oil or crude oil adsorbent are removed by a coarse separation, the suspension is filtered by a high performance filter or the like, and salts interfering with subsequent disposal are removed as in liquid form. Finally, the water content which interferes with combustion is removed by drying the recovered fuel oil or crude oil adsorbent.

When the aforesaid suspension is directly filtered by a high performance filter, stones or sand larger than the fuel oil or crude oil adsorbent may be recovered together with the adsorbent. Fuel oil or crude oil adhering to the stones and sand can be simultaneously decomposed when the oil adhering to the adsorbent is decomposed, therefore this invention may be employed not only to dispose of recovered fuel oil or crude oil, but also to cleanse stones or sand.

The method for disposal of spilled fuel oil or crude oil according to this invention may be further characterized by a step for mixing high viscosity fuel oil or crude oil containing disposal inhibiting substances with an adsorbent, a step for separating and recovering adsorbent to which fuel oil or crude oil adheres in the adsorbent mixing step, and a step for decomposing and removing fuel oil or crude oil in the adsorbent resulting from the mixing step or recovered from the recovery step.

In the aforesaid fuel oil or crude oil decomposing and removal step, fuel oil or crude oil adhering to the fuel oil or crude oil adsorbent oil is decomposed.

The decomposing method used may freely be selected from the following options according to the intended purpose.

First, an incineration method can be adopted. In this incineration method, heat is applied to the fuel oil or crude oil adsorbent, and adhering fuel oil or crude oil is burnt and decomposed to carbon dioxide. According to this method, the heat of combustion can be used as a heat source, and it is therefore economical. However there is a problem in that black smoke is generated in the combustion process.

When this method is used, it is necessary to remove disposal inhibiting substances from the fuel oil or crude oil adsorbent, in particular sea water or salts which interfere with combustion reactions.

Secondly, an oxidizing agent may be used to effect the decomposition. The oxidizing agent comes in contact with the fuel oil or crude oil adhering to the adsorbent, and decomposes it to carbon dioxide by oxidizing it. When such an oxidizing agent is used, there is an advantage in that the black smoke generated in the combustion method mentioned hereabove is not produced.

As aforesaid oxidizing agent, any of the following known oxidizing agents can be utilized, but in order to handle a large quantity of fuel oil or crude oil adsorbent, it is desirable to use the following oxidizing agents as they do not generate waste products.

$Ag^{2+}$, which is produced when mediatory electrolytic oxidation is performed using an electrolyte containing $Ag^+$, and active species resulting therefrom, may, for example, be used as oxidizing agents. $Ag^{2+}$ has particularly strong oxidizing power which oxidatively degrades the fuel oil or crude oil adhering to the adsorbent. $Ag^{2+}$ also decomposes water in the electrolyte forming active species such as the OH. and O. radicals, and fuel oil or crude oil adhering to the adsorbent is oxidatively degraded by this active species. This $Ag^{2+}$ becomes $Ag^+$ when it oxidizes the fuel oil or crude oil, but the $Ag^+$ is electrolytically re-oxidized to $Ag^{2+}$ so that it can again function as an oxidizing agent. Namely, $Ag^{2+/+}$ ion acts as a mediator during electrolysis of oils. Therefore, according to this method, the fuel oil or crude oil is decomposed without generating waste products after oxidative degradation. As Ag is comparatively costly, it is desirable to recover Ag after decomposition is complete by reversing the polarity of the electrodes and depositing silver at the cathode.

Another oxidizing agent which may be used is a positive hole of an electron-hole pair formed in the adsorbent when it is irradiated by radiation rays, or an active species produced by this positive hole.

When this method is adopted in the fuel oil or crude oil decomposition step, it is preferable to use a semiconductor such as $TiO_2$ as adsorbent. In a semiconductor such as $TiO_2$, a band gap of fixed width exists between a valence band and a conduction band (approximately 3 or 4 eV). When such an adsorbent is irradiated by radiation rays, an electron-hole pair ($e^- - h^+$) is formed in the adsorbent, and this positive hole ($h^+$) has a strong oxidizing power which oxidizes the fuel oil or crude oil. As a result of this oxidation, the fuel oil or crude oil in the adsorbent is decomposed to carbon dioxide, and is thereby removed. Surrounding water molecules, etc., are also oxidized by this positive hole thereby forming active species, and these active species then contribute to the oxidative degradation of the fuel oil or crude oil.

The positive hole formed in this adsorbent is reduced to its original state when it oxidizes fuel oil or crude oil or a water molecule. In other words, according to this method, the adsorbent used functions not only as an oil adsorbent but also as an oxidation catalyst, and it thereby assists in the oxidative degradation of adhering fuel oil or crude oil.

The aforesaid two oxidizing agents do not produce any black smoke. Also, in the aforesaid methods, any stones or sand which may be present have no effect on disposal of the oil. Moreover, fuel oil or crude oil adhering to stone and sand are simultaneously decomposed so that these methods cleanse the environment. In any of the aforesaid decomposition methods, the adsorbent is the end product. As this remaining adsorbent can be re-utilized to adsorb fuel oil or crude oil, it is recovered with a view to its re-use. Therefore, according to this invention, spilled fuel oil or crude oil can be processed without generating secondary toxic environmental pollutants such as waste products.

If any of the aforesaid oxidizing agents, particularly $Ag^{2+}$ which is produced by electrolytic oxidation, are used to decompose and treat the fuel oil or crude oil, while efficiency is somewhat less than in the case where an adsorbent is used, high viscosity oil can be directly oxidatively decomposed.

Specifically, when an electrolyte containing $Ag^+$ is used, spilled fuel oil or crude oil which has been directly recovered is introduced into this electrolyte, and electrolytic oxidation is performed in this state. Due to this electrolytic oxidation, $Ag^+$ is oxidized to $Ag^{2+}$ and oxidizing agents are produced in the electrolyte. The $Ag^{2+}$ formed here oxidizes water molecules of the electrolyte, and active species are thereby generated. This $Ag^{2+}$ and active species come in contact with the surface of coagulated fuel oil or crude oil, and decomposition of the fuel oil or crude oil proceeds from the part where they come in contact.

By this method, spilled fuel oil or crude oil can be treated directly, and stones and sand on a beach can be cleansed.

Materials in the environment such as stones and sand can also be cleansed when an adsorbent is used. However when an adsorbent is used, to recover the adsorbent, the residual absorbent must be separated from the environmental substances, e.g., by filtering.

BRIEF DESCRIPTION OF THE DRAWINGS

FIG. 2 shows a fuel oil decomposition and removal step performed by incineration.

FIG. 3 shows a fuel oil decomposition and removal step performed by an electrolytic oxidation method.

FIG. 4 shows a fuel oil decomposition and removal step by radiation ray catalyst method.

DETAILED DESCRIPTION OF THE PREFERRED EMBODIMENTS

Figure 1:
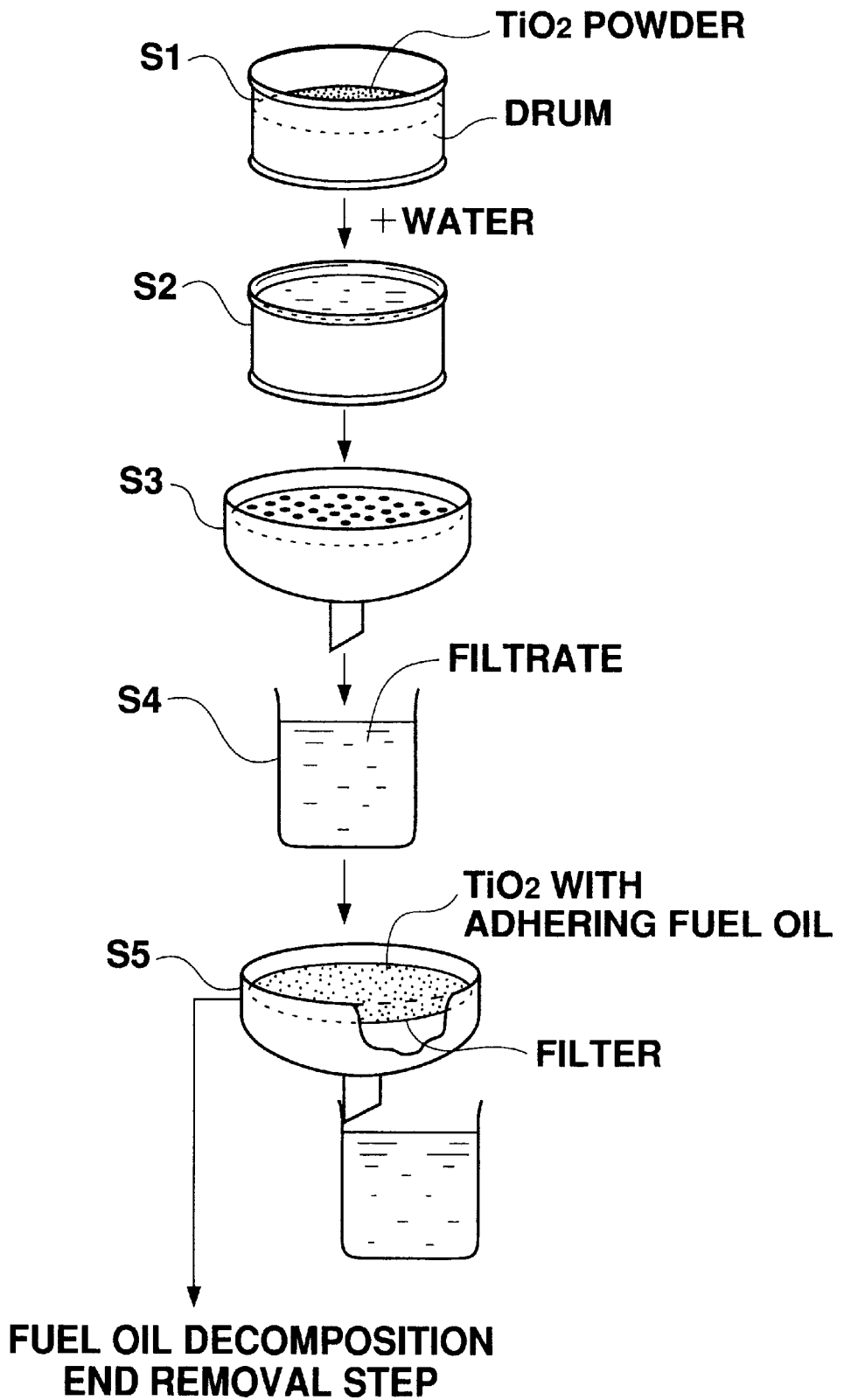
FIG. 1 shows the procedure of an adsorbent mixing step, and a fuel oil adsorbent recovery step.

FIG. 1 shows a method for disposal of recovered fuel oil and crude oil comprising an adsorbent mixing step and a fuel oil adsorbent recovery step. The method described here mainly relates to the disposal of fuel oil.

(1) Adsorbent mixing step

The adsorbent mixing step is shown in FIG. 1. Spilled fuel oil which has been recovered in, for example, drums is added to and mixed with an adsorbent (S1). The additional amount of adsorbent used herein differs, depending on the type of adsorbent and its particle size, but when, for example, titanium dioxide ($TiO_2$) having a particle size of several tens of nanometers to several hundred micrometers is used, the amount must be at least 0.2 to 1 times the amount of spilled fuel oil expressed as a weight ratio. $Al_2O_3$ has less ability to adsorb fuel oil than titanium dioxide, so at least approximately 5 times more adsorbent must be added than in the case of titanium dioxide. $ZrO_2$ has an adsorbing power which is intermediate between that of titanium dioxide and $Al_2O_3$, so approximately 2 times more adsorbent is necessary than in the case of titanium dioxide.

To determine whether or not the addition amount of adsorbent is sufficient, a part of it may be suspended in water after mixing and observing whether or not the fuel oil floats on the water surface. Specifically, when the fuel oil floats on the water, the amount of adsorbent is insufficient, and it is necessary to increase the amount of adsorbent added. Conversely, when the fuel oil does not float on water, it indicates that the required amount of adsorbent has been mixed.

To mix the adsorbent, it is added to the spilled fuel oil and blended by stirring. As the spilled fuel oil has a high viscosity, an operation such as stirring is necessary to allow the adsorbent to fully adsorb the fuel oil.

By mixing adsorbent as described hereabove, fuel oil components in high viscosity spilled fuel oil containing sea water, etc., are specifically adsorbed by the adsorbent. After mixing with the adsorbent, the viscosity of the spilled fuel oil decreases so that it can be dispersed by, for example, stirring in water. As a result, in the fuel oil adsorbent recovery step described hereafter, disposal inhibiting substances such as chlorine and other sea water components, and algae, etc., which are present in the fuel oil, can be separated from the oil. Sand and stones in the highly viscous, spilled oil may also be separated.

(2) Fuel oil adsorbent recovery step

In the fuel oil adsorbent recovery step, adsorbent from the aforesaid mixing step to which fuel oil adheres is separated from disposal inhibiting substances and recovered. This may be done by the following procedure.

After the aforesaid adsorbent mixing step, water is added to the drums of oil so that the mixture is suspended in the water (S2). This causes the adsorbent with adhering fuel oil and disposal inhibiting substances to disperse in the water. However, although the viscosity of the oil falls when the adsorbent is mixed with it as described above, it still retains some viscosity and it is therefore preferable to disperse it by using a stirrer when it is suspended in the water. By stirring in water, sea water components in the spilled oil dissolve, and sand and stones are separated from the oil.

Next, this suspension is filtered using a coarse mesh filter, disposal inhibiting substances larger than the adsorbent such as algae, sand, and stone are removed (S3), and the filtrate is recovered (S4).

The filtrate thus obtained is passed through a high performance filter (of sufficiently small mesh to recover the adsorbent), the adsorbent with adhering fuel oil is recovered on the filter, and sea water is removed together with the water used to make the suspension (S5). Finally, the adsorbent which was recovered on the filter is dried to remove moisture. This drying may be performed by resting at ambient temperature, by heating, or by placing in a vacuum desiccator.

As sea water and other substances inhibiting disposal of the fuel oil are thereby almost completely removed from the oil, the fuel oil can be incinerated by the process described herebelow.

In the aforesaid procedure, the coarse separation step (S3) may be omitted, the adsorbent with adhering fuel oil being recovered together with large stones and sand. If the stones and sand are recovered together with the adsorbent, fuel oil adhering to the stones and sand can be decomposed when the fuel oil adhering to the adsorbent is decomposed as described below, and the stones and sand can thereby be cleansed simultaneously.

(3) Fuel oil decomposition and removal step

The fuel oil decomposition and removal step is shown in FIG. 2. In this fuel oil decomposition and removal step, fuel oil adhering to the recovered adsorbent is decomposed. Three methods are described here.

In the first decomposition method, fuel oil is decomposed by incinerating the fuel oil adsorbent after the drying mentioned above. When fuel oil is decomposed and removed by incineration on an experimental scale, for example, the fuel oil adhering to the adsorbent may be directly decomposed to carbon dioxide by a burner or the like. When disposal of large quantities is required, incinerators are used. This method is economical as the heat of combustion can be utilized as a heat source, however there is a problem in that black smoke is produced during combustion.

The decomposition methods using oxidizing agents described below are however not accompanied by the generation of black smoke. A second fuel oil decomposition method (mediatory electrolytic oxidation method) is shown in FIG. 3. In this second fuel oil decomposition method, $Ag^{2+}$ produced during the electrolytic oxidation of an electrolyte containing $Ag^+$, and active species generated therefrom, are used as oxidizing agents.

The details of this method are as follows. When the electrolyte containing $Ag^+$ is electrolyzed, $Ag^+$ in the electrolyte is oxidized to $Ag^{2+}$ at the anode. The $Ag^{2+}$ formed here functions as an oxidizer having strong oxidizing power, and it oxidatively degrades fuel oil to carbon dioxide according to the reaction shown below. $Ag^{2+}$ also decomposes water in the electrolyte producing an active species such as OH. and O. radicals, and the fuel oil is oxidatively degraded also by this active species. The $Ag^{2+}$ which contributed to oxidative degradation here is converted to $Ag^+$, and re-oxidized to $Ag^{2+}$ at the anode so that it can again perform the oxidative degradation of fuel oil.

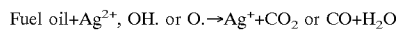

$$\text{Fuel oil} + Ag^{2+}, OH. \text{ or } O. \rightarrow Ag^+ + CO_2 \text{ or } CO + H_2O$$

In the above method, platinum may be used for the electrodes and nitric acid solution may be used as the electrolyte. The concentration of nitric acid solution may be of the order 3M on the anode side and of the order of 13M on the cathode side. The Ag concentration in this electrolyte must be at least approximately 0.5M, but it may also be higher.

The current density used in the electrolysis may lie within a range of approximately 8 to 500 $m/cm^2$, but preferably should be within the lower part of this range. When a high current density is used, care must be taken since the temperature of the electrolyte rises when the electrolysis reaction is performed for a long period of time.

The end of oxidative degradation may be determined by monitoring the carbon dioxide generated during the fuel oil decomposition, and detecting when no further carbon dioxide is produced.

In this method, when the fuel oil contains sea water, the chlorine in the sea water reacts with the silver so that the latter is deposited as silver chloride, hence it is preferable that the sample does not contain sea water. However even when fuel oil containing sea water is used, the fuel oil may still be decomposed by adding an excess of silver.

In a third fuel oil decomposition reaction (radioactive ray catalyst method), a positive hole of an electron-hole pair formed in the adsorbent when the adsorbent is irradiated by radiation rays, or an active species produced by this positive hole, is utilized as an oxidizing agent to perform oxidative degradation of the fuel oil.

When this method is adopted as the fuel oil decomposition step, it is preferable to use a semiconductor as the adsorbent, and more preferably $TiO_2$ which has a high fuel oil adsorption capacity.

A semiconductor such as $TiO_2$ has a band gap of fixed width between a valence band and conduction band, so when an adsorbent fabricated from this semiconductor is irradiated by radiation rays, an electron-hole pair is formed in the adsorbent. The positive hole ($h^+$) has a strong oxidizing power which oxidizes fuel oil, and the fuel oil adhering to the adsorbent is thereby decomposed to carbon dioxide and removed. Surrounding water molecules are also oxidized by this positive hole thereby forming an active species, and this active species also contributes to the oxidative degradation of the fuel oil. The decomposition method is illustrated by the following reaction:

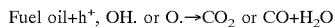

Fuel oil+$h^+$, OH. or O.→$CO_2$ or CO+$H_2O$

When the fuel oil or water molecules are oxidized, the positive hole is reduced to its original state, but upon further irradiation, electrons are excited, an electron-hole pair is again formed and more fuel oil is oxidatively degraded.

Specifically, as shown in FIG. 4, the adsorbent with adhering fuel oil is suspended in water, and irradiated by radiation rays from an external source. The radiation rays emitted by this external source may be gamma rays or X rays. Upon irradiation, the reaction stated hereabove occurs, and adhering fuel oil is thereby oxidatively degraded.

In the second and third fuel oil decomposition methods described hereabove, unlike the case of the first fuel oil decomposition method, black smoke is not produced. Moreover, even when stones and sand are present as disposal inhibiting substances, they have almost no effect, and, as the fuel oil adhering to the stones and sand is simultaneously decomposed, these methods contribute to the cleansing of the environment.

(4) Adsorbent recovery step

After decomposing fuel oil by the aforesaid methods, the adsorbent remains. This remaining adsorbent can be re-used to adsorb fuel oil, so the adsorbent is recovered with a view to its re-use.

In particular, when the second fuel oil decomposition method is adopted, Ag which is comparatively costly is present in the electrolyte, so it is desirable to recover the adsorbent after first recovering Ag. Ag can be recovered by passing a current with the anode and cathode reversed, whereupon silver separates out at the cathode. After recovering Ag, the adsorbent which has sedimented in the electrolyte is recovered. By finally recovering the adsorbent in this way, disposal of spilled fuel oil can be performed without generating waste products or other secondary environmental pollutants.

EXAMPLES

This invention will now be described in more detail using a specific example. This example illustrates fuel oil decomposition by the second decomposition method stated hereabove.

5 g of titanium dioxide was mixed with 10 g of spilled fuel oil, and the spilled oil adsorbed by the titanium dioxide. After mixing, the mixture was suspended in 200 ml of pure water so as to disperse it in the water. After dispersion, the suspension liquid was filtered by a membrane filter to remove sea water, etc., and the titanium dioxide particles which had adsorbed fuel oil particles were recovered. The recovered titanium dioxide particles were dried in a vacuum desiccator, and emulsified in a mortar so as to obtain fuel oil adsorbed on titanium dioxide ($TiO_2$).

The fuel oil adsorbed on titanium dioxide was dispersed in an electrolysis tank containing an electrolyte. The anolyte was 3M nitric acid comprising 0.5M Ag. A platinum plate was used as anode, and a platinum rod was used as cathode. The catholyte was 13.3 M nitric acid. Under these conditions, electrolysis was performed at a current density of 8.3 $mA/cm^2$ with stirring.

After beginning electrolytic decomposition, residual carbon was measured by a total organic substance measurement apparatus (Shimazu Inc., TOC-5000), and the decomposition proportion and average decomposition rate were computed from this carbon amount. Table 1 shows the results (right-hand column, third run). The results of an electrolytic decomposition performed under the same conditions on recovered, high viscosity spilled fuel oil coated on a Teflon rod are also shown (middle column, second run).

TABLE 1

Decomposition of sea water-containing spilled fuel oil by electrolysis

| Experimental conditions and results | | Run | | |
|---|---|---|---|---|
| | | 1st | 2nd | 3rd |
| Fuel oil introduced | | Spilled fuel oil 0.3332 g Total carbon 74.6 mg | Spilled fuel oil 0.2257 g Total carbon 50.6 mg | Fuel oil adhering to $TiO_2$ 1.0259 (0.3276) g*[1] Total carbon 287.5 mg |
| Electrolysis conditions | | Ag: 0.5 M Electrolyte: 3M nitric acid Current density: 500 $mA/cm^2$ Current: 2A Electrolysis time: 18 hr | Ag: 0.5 M Electrolyte: 3M nitric acid Current density: 8.3 $Am/cm^2$ Current: 1A Electrolysis time: 18 hr | Ag: 0.5 M Electrolyte: 3M nitric acid Current density: 8.3 $mA/cm^2$ Current: 1A Electrolysis time: 7 hr |
| Results | Residual amount | 24.9 mg | 29.0 mg | |
| | Remaining total carbon | 14.2 mg | 18.9 mg | 120.1 mg*[2] |
| | Final electrolysis temperature | 45° C. | 29° C. | 29° C. |
| Decomposition proportion | Computed from weight | 92.5% | 87.2% | |
| | Computed from carbon weight | 81.0% | 62.6% | 58.2% |
| Average decomposition rate | Computed from weight | 17.1 mg/hr | 10.9 mg/hr | |
| | Computed from carbon weight | 3.4 mg/hr | 1.8 mg/hr | 23.9 mg/hr |

N.B. [1]: Figures in brackets indicate weight of fuel oil adhering to titanium dioxide.
N.B. [2]: A3 the oil film adhering to the beaker, etc., cannot be completely recovered, the residual carbon in adhering subtances was computed as twice the experimental value.

When fuel oil adsorbed on titanium dioxide was oxidatively degraded under the aforesaid conditions, 58.2% of the fuel oil was decomposed in a reaction time of 7 hours.

When recovered spilled fuel oil was directly coated on a Teflon rod without mixing with adsorbent and subjected to oxidative degradation under the aforesaid conditions, 62.6% of the fuel oil was decomposed in a reaction time of 18 hours.

From a comparison of these average decomposition rates, it was found that by first mixing the fuel oil with titanium dioxide in order to adsorb the fuel oil, the decomposition rate was increased by approximately 15 times. This may be due to the fact that adsorbing the fuel oil on titanium dioxide makes it possible to disperse it in the electrolyte and increases the contact surface area, thereby increasing the frequency of contact between $Ag^{2+}$ and fuel oil.

Also, electrolysis of recovered, spilled fuel oil was performed directly under the aforesaid conditions at a current density of 500 $mA/cm^2$ (left-hand column). The decomposition proportion increased by 81% and the average decomposition rate increased by two times compared to the case when it was performed at a current density of 8.3 $mA/cm^2$. However, it was found that at a current density of 500 $mA/cm^2$, the temperature of the electrolyte rose and evaporation of electrolyte was observed. This suggests that it is advisable to perform the electrolysis at a current density lower than 500 $mA/cm^2$ in view of keeping high current efficiency.

From the aforesaid results it is seen that, when oxidative degradation was used as the fuel oil decomposition method, high viscosity, spilled fuel oil can be decomposed directly, but the decomposition rate is increased by approximately 15 times by adsorbing the oil on titanium dioxide particles.

These results show that when treating a large amount of spilled fuel oil, it is far more effective to decompose the oil after first adsorbing it on titanium dioxide as shown in this example. However, when it is desired to decompose fuel oil adhering to materials in the environment such as stones or sand and to cleanse these materials, or when it is undesirable to mix titanium dioxide with the oil, the oil may nevertheless be decomposed by electrolytic oxidation directly.

According to this invention, high viscosity, spilled oil, difficult to dispose of using conventional methods, can be treated easily. By mixing the adsorbent with the high viscosity, spilled oil, the viscosity of the oil is decreased and can be dispersed in water. As a result, substances in the spilled oil such as algae, stones, sand, chlorine, and sea water which interfere with its disposal are removed, and subsequent decomposition of the oil is enhanced. Also, by dispersing the oil in water, the contact surface area of fuel oil adhering to the surface of the adsorbent is increased, and this improves the efficiency of subsequent decomposition with improving current efficiency.

By subjecting spilled fuel oil to the aforesaid separation step, the oil can be incinerated despite the fact that it could not be incinerated in its original state. In addition to incineration, the fuel oil may be decomposed by other methods using various oxidizing agents which do not generate black smoke as is produced in the incineration method, whereby the fuel oil can be decomposed without polluting the environment.

According to this example, stones, sand, and other environmental materials which may be mixed with the spilled oil can also be cleansed. Moreover, the invention may be used not only for decomposing spilled oil mixed with other materials, but also for decomposing oil adhering to the seabed or on beaches, etc. It can therefore be generally used for environmental clean-up in a wide sense.

What is claimed is:

1. A method for disposal of spilled fuel oil or crude oil, comprising mixing an adsorbent with high viscosity, solidified spilled fuel oil or crude oil containing disposal inhibiting substances to form a mixture wherein during the mixing, fuel oil or crude oil is adhered to the adsorbent to form a fuel oil or crude oil-containing adsorbent.

2. A method for disposal for spilled fuel oil or crude oil as defined in claim 1, further comprising recovering the fuel oil or crude oil-containing adsorbent by separating the fuel oil or crude oil-containing adsorbent from the mixture.

3. A method for disposal of spilled fuel oil or crude oil as defined in claim 2, wherein the recovering of the fuel oil or crude oil-containing adsorbent comprises suspending the mixture resulting from said mixing in water to form a suspension and directly filtering the suspension to recover the fuel oil or crude oil-containing adsorbent.

4. A method for disposal of spilled fuel oil or crude oil as defined in claim 2, further comprising decomposing and removing the fuel oil or crude oil adhered to said adsorbent resulting from said mixing or said recovering.

5. A method for disposal of spilled fuel oil or crude oil as defined in claim 4, further comprising recovering adsorbent remaining after said decomposing and removing of the fuel oil or crude oil adhered to said adsorbent.

6. A method for disposal of spilled fuel oil or crude oil as defined in claim 1, wherein said adsorbent is an oxide powder.

7. A method for disposal of spilled fuel oil or crude oil as defined in claim 6, wherein said oxide powder is $TiO_2$, $ZrO_2$, or $Al_2O_3$.

8. A method for disposal of spilled fuel oil or crude oil as defined in claim 4, wherein said decomposing and removing of the fuel oil or crude oil adhered to the adsorbent comprises incinerating said fuel oil or crude oil adhered to said adsorbent.

9. A method for disposal of spilled fuel oil or crude oil as defined in claim 4, wherein said decomposing and removing of the fuel oil or crude oil adhered to the adsorbent comprises bringing the fuel oil or crude oil adhered to the adsorbent into contact with an oxidizing agent.

10. A method for disposal of spilled fuel oil or crude oil as defined in claim 9, wherein said oxidizing agent is $Ag^{2+}$ generated by electrolytic oxidation using an electrolyte comprising $Ag^+$, and active species generated therefrom.

11. A method for disposal of spilled fuel oil or crude oil as defined in claim 9, wherein said oxidizing agent is a positive hole of an electron-hole pair formed in said adsorbent by irradiating said adsorbent, and active species generated from said positive hole.

12. A method for disposal of spilled fuel oil or crude oil as defined in claim 2, wherein the recovering of the fuel oil or crude oil-containing adsorbent comprises suspending the mixture resulting from the mixing in water to form a suspension, removing from the suspension disposal inhibiting substances of greater size than said fuel oil or crude oil-containing adsorbent by performing a coarse separation, and then, following the removing, filtering the suspension to recover the fuel oil or crude oil-containing adsorbent.

13. A method for disposal of spilled fuel oil or crude oil as defined in claim 1, wherein the disposal inhibiting substances comprise sea water, algae, stones or sand.

14. A method for disposal of spilled fuel oil or crude oil as defined in claim 1, wherein the adsorbent is mixed with the high viscosity, solidified spilled fuel oil or crude oil in an amount effective to adsorb the fuel oil or crude oil and lower the viscosity of the high viscosity, solidified spilled fuel oil or crude oil to render the spilled fuel oil or crude oil dispersible in water.

15. A method for disposal of spilled fuel oil or crude oil, comprising mixing an adsorbent with high viscosity, non-water dispersible spilled fuel oil or crude oil containing disposal inhibiting substances to form a mixture, wherein the adsorbent is added in an amount effective to adsorb fuel oil or crude oil in the mixture and lower the viscosity of the high viscosity, non-water dispersible spilled fuel oil or crude oil to render the spilled fuel oil or crude oil dispersible in water.

* * * * *